United States Patent
Glantz et al.

(10) Patent No.: US 10,601,061 B2
(45) Date of Patent: Mar. 24, 2020

(54) FUEL CELL BASED CHARGER SYSTEM AND FUEL GENERATOR THEREFOR

(71) Applicant: MYFC AB, Stockholm (SE)

(72) Inventors: Michael Glantz, Åhus (SE); Björn Westerholm, Saltsjö-Duvnäs (SE); Henrik Olsson, Solna (SE); Sean McGee, Stockholm (SE)

(73) Assignee: MYFC AB (SE)

( * ) Notice: Subject to any disclaimer, the term of this patent is extended or adjusted under 35 U.S.C. 154(b) by 58 days.

(21) Appl. No.: 15/572,431

(22) PCT Filed: May 4, 2016

(86) PCT No.: PCT/EP2016/060058
§ 371 (c)(1),
(2) Date: Nov. 7, 2017

(87) PCT Pub. No.: WO2016/177813
PCT Pub. Date: Nov. 10, 2016

(65) Prior Publication Data
US 2018/0138531 A1  May 17, 2018

(30) Foreign Application Priority Data

May 7, 2015 (SE) ........................................ 1550580

(51) Int. Cl.
*H01M 8/065* (2016.01)
*C01B 3/08* (2006.01)
(Continued)

(52) U.S. Cl.
CPC ............... *H01M 8/065* (2013.01); *C01B 3/08* (2013.01); *H01M 8/04201* (2013.01); *H01M 8/22* (2013.01); *H01M 2250/30* (2013.01)

(58) Field of Classification Search
None
See application file for complete search history.

(56) References Cited

U.S. PATENT DOCUMENTS

2008/0193806 A1  8/2008  Kulakov
2010/0172805 A1* 7/2010  Kamitani ............... C01B 3/065
                                                    422/112

FOREIGN PATENT DOCUMENTS

DE  10 2012 224 246 A1  4/2014
JP       2009-107895     5/2009
JP       2014-159344     9/2014

OTHER PUBLICATIONS

Chen et al. (Int J Energy Environ Eng (2014) 5:87). (Year: 2014).*
(Continued)

*Primary Examiner* — Wojciech Haske
(74) *Attorney, Agent, or Firm* — Adsero IP

(57) ABSTRACT

The invention relates to a fuel generator (12) for a fuel cell based charger system, and a system containing a charger (10) and a fuel generator. The generator comprises a compartment (20') containing aluminium, means (18', 20', 21, FW) for providing a solution of water and a water soluble compound capable of reacting with aluminium to generate hydrogen gas, when dissolved in water and brought into contact with the aluminium, and means (FS) for passing said solution into the compartment containing aluminium. The invention also provides a method of operating the system. It comprises providing a fuel generator and a hydrogen driven fuel cell based charger device having means for accommodating the generator. The generator and charger having a common interface cooperative for providing fluid communication between the generator and the charger. The system is primed by inserting the generator into the charger whereby the interface opens up fluid communication between selected parts of the system. A flow of reaction solution is initiated so as to bring it into contact with the aluminium whereby hydrogen begins to be produced, the hydrogen is fed to the fuel cells in the fuel cell assembly whereby electricity is produced.

16 Claims, 13 Drawing Sheets

(51) Int. Cl.
*H01M 8/04082* (2016.01)
*H01M 8/22* (2006.01)

(56) References Cited

OTHER PUBLICATIONS

International Search report for PCT/EP2016/060058, dated May 31, 2016, 5 pages.

\* cited by examiner

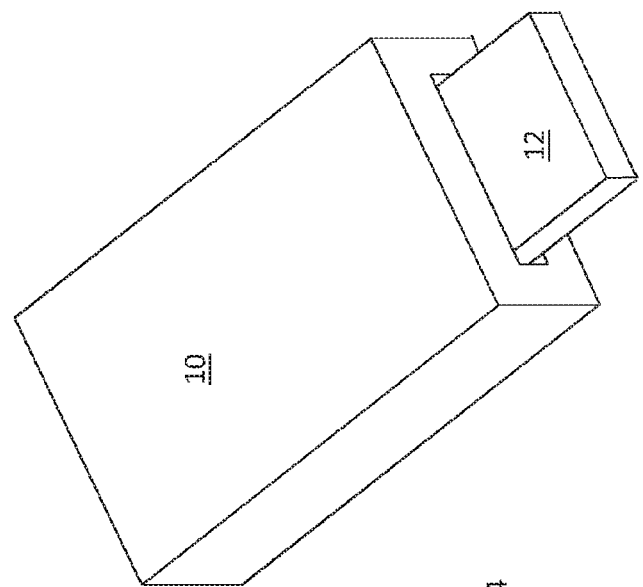
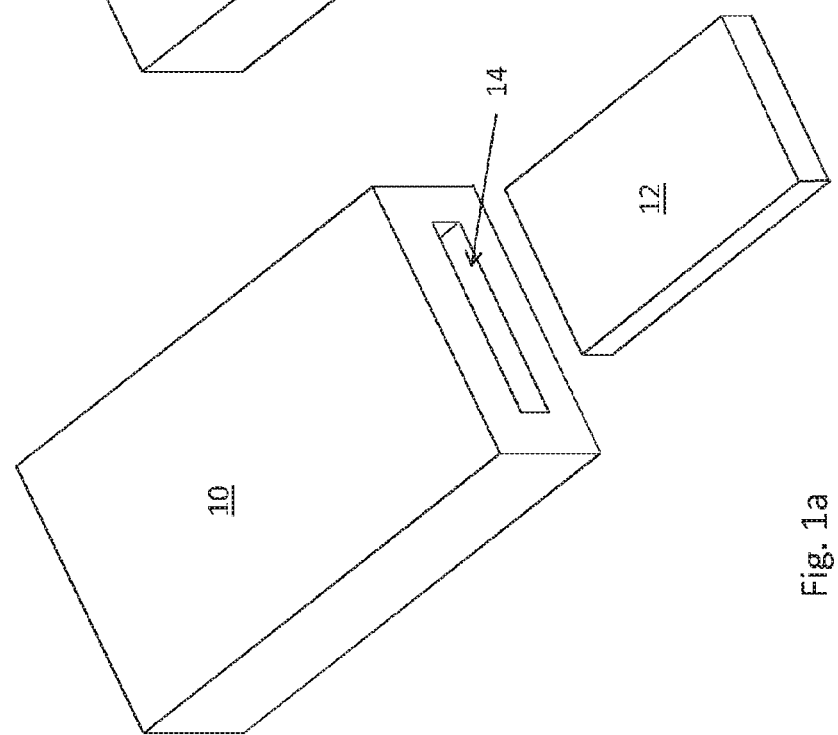
Fig. 1b
Fig. 1a

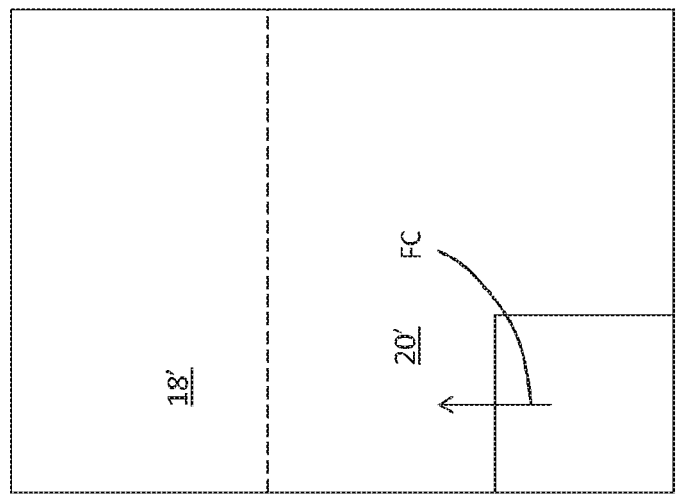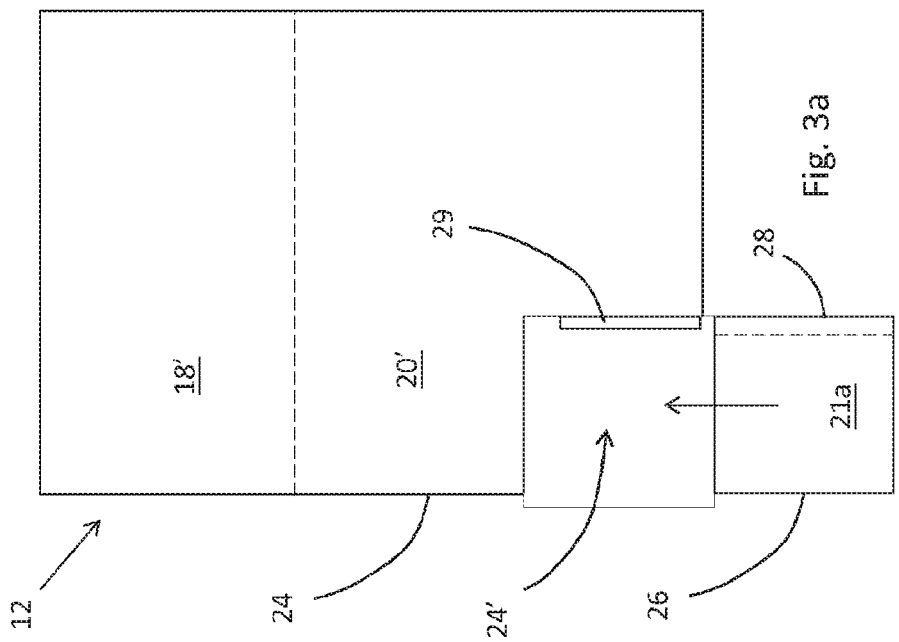

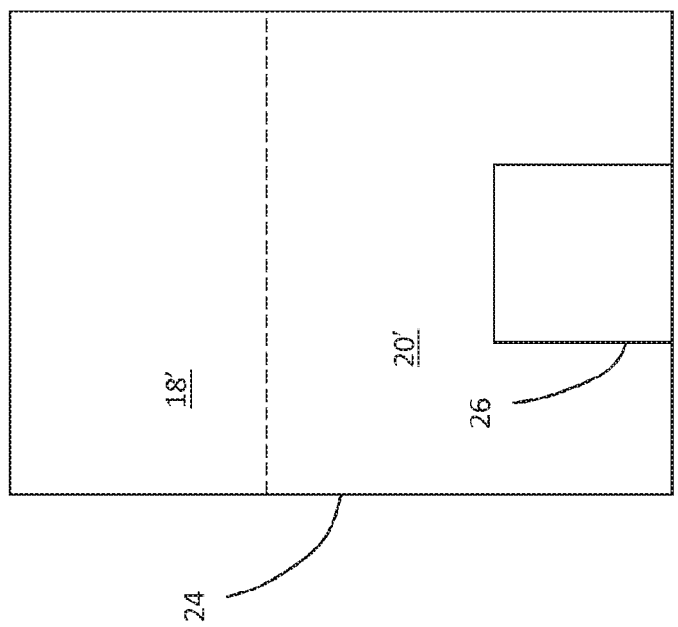

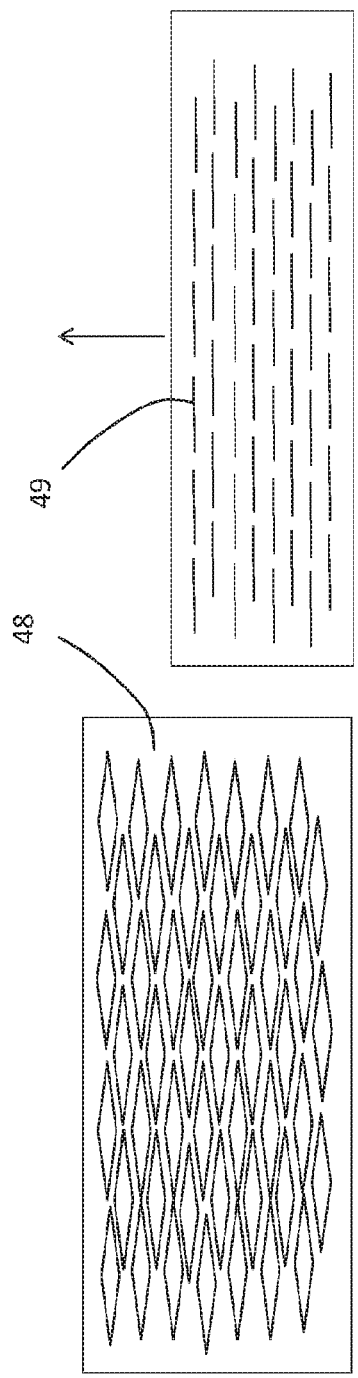
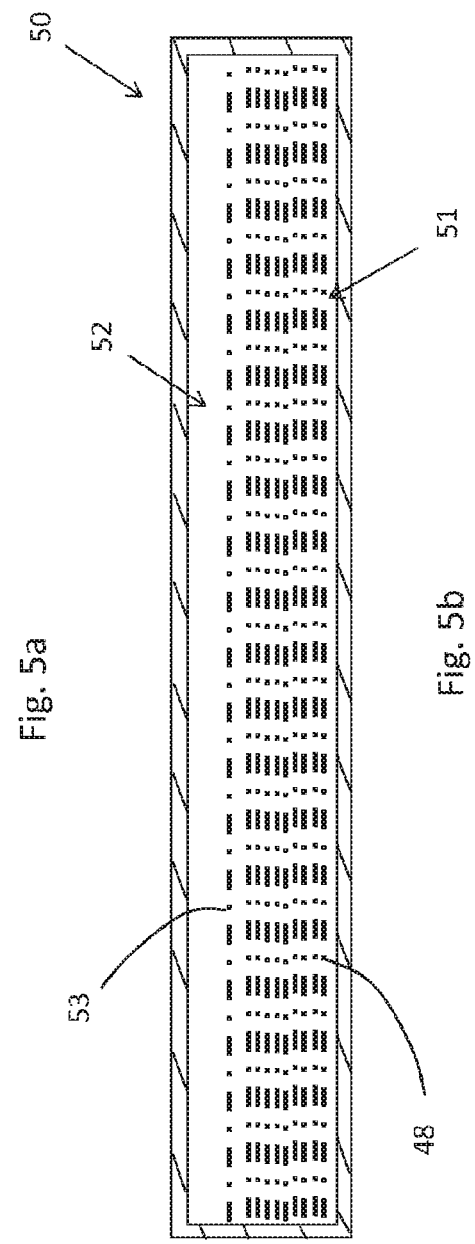
Fig. 5a
Fig. 5b

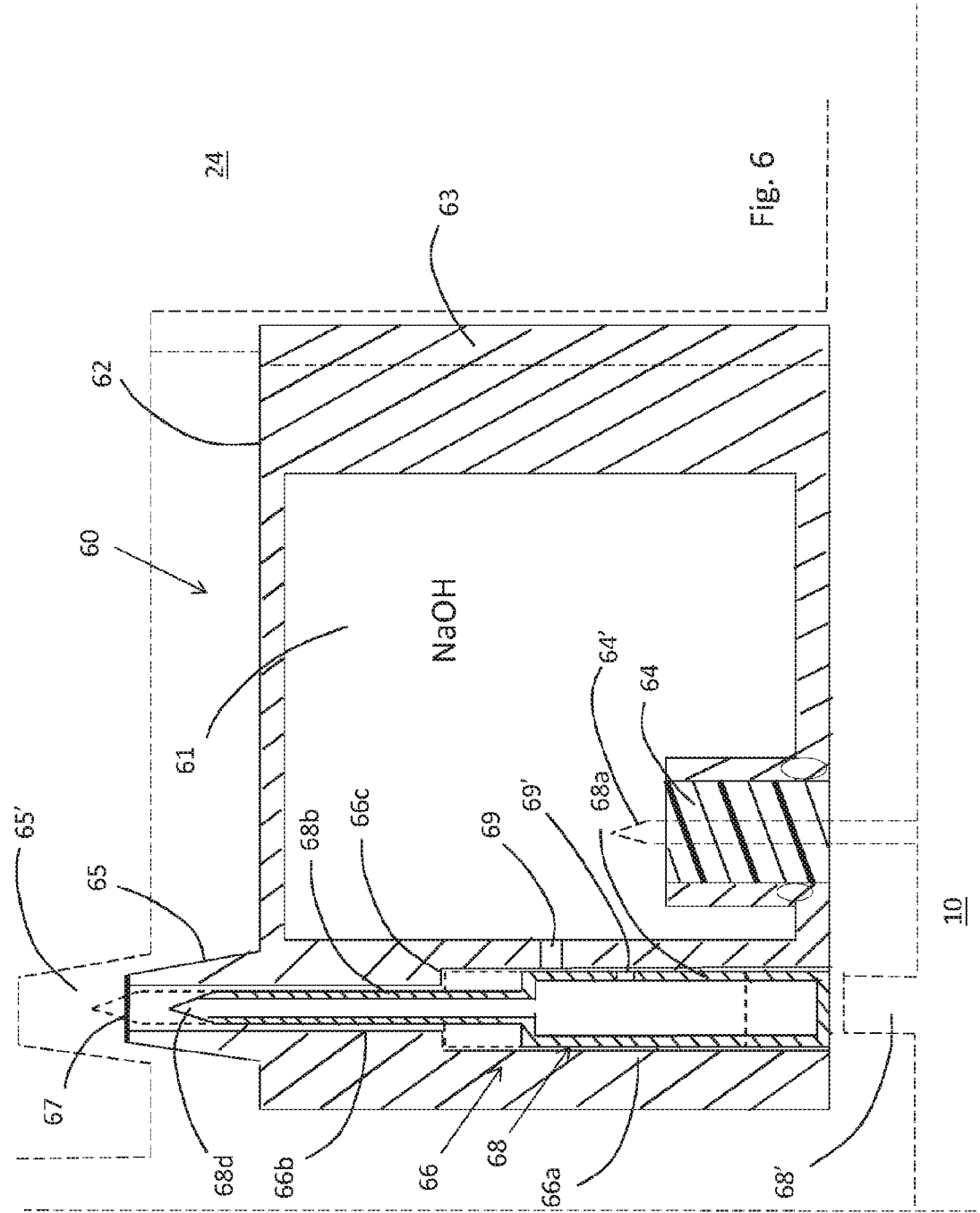

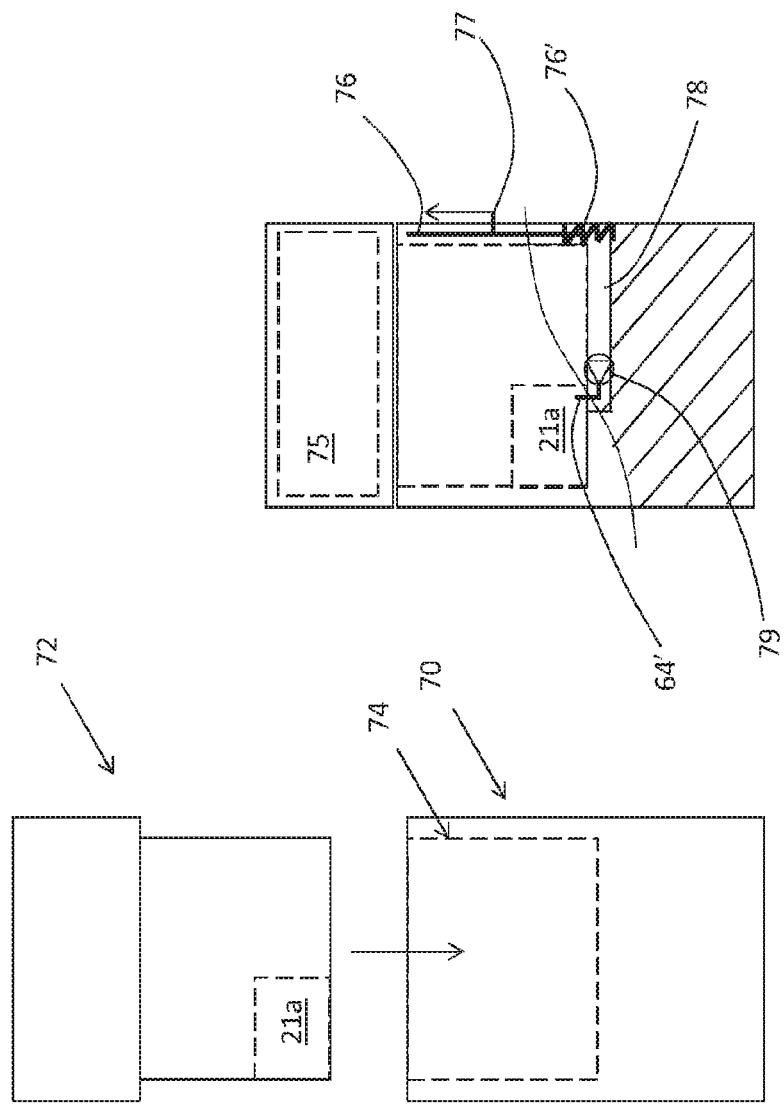

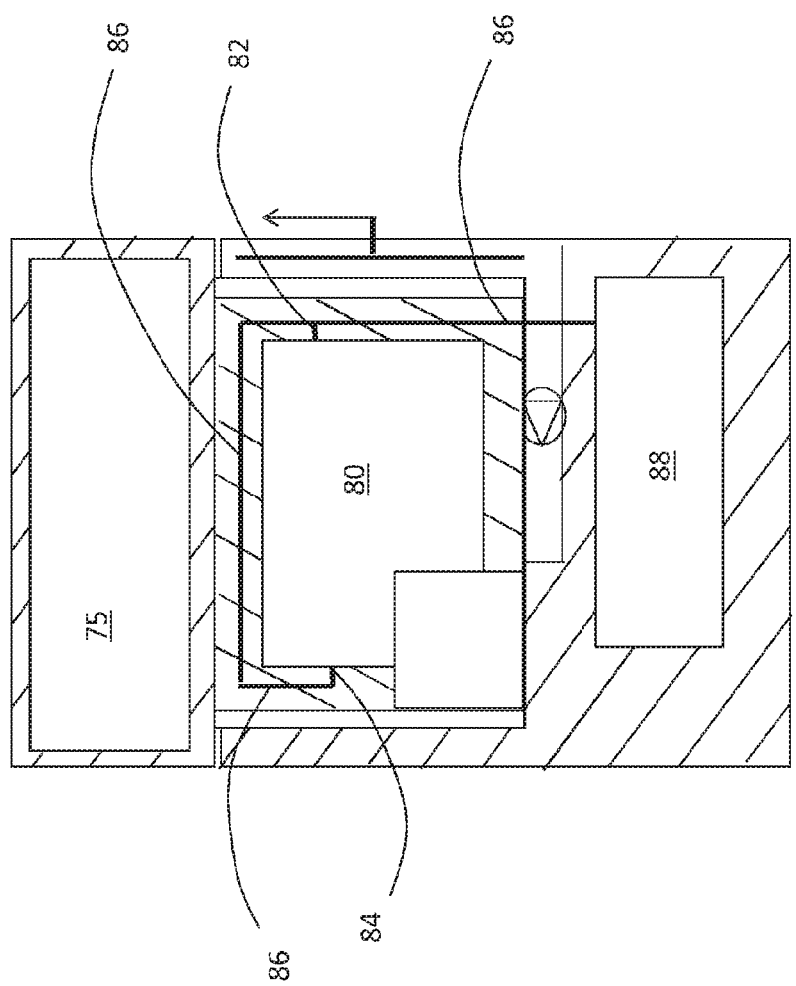

US 10,601,061 B2

FUEL CELL BASED CHARGER SYSTEM AND FUEL GENERATOR THEREFOR

CROSS-REFERENCE TO RELATED APPLICATION

This application claims priority to and is a 35 U.S.C. § 371 national phase application of PCT/EP2016/060058 (WO2016/177813), filed on May 4, 2016 entitled "FUEL CELL BASED CHARGER SYSTEM AND FUEL GENERATOR THEREFOR", which application claims priority to and the benefit of Swedish Patent Application No. 1550580-3, filed May 7, 2015; the disclosures of which are incorporated herein by reference in their entirety.

The present invention relates to fuel cell based systems and in particular to chargers and to fuel generators for such systems.

BACKGROUND OF THE INVENTION

Fuel cell technology has developed rapidly over the last decade, and is today in use for numerous applications. One example is where micro fuel cells are used in small portable charger systems for the production of electricity for electronic equipment such as mobile phones, computers and the like.

Common fuels for such systems are e.g. methanol and hydrogen. In the latter case the hydrogen is normally produced from hydrides which react with water to produce hydrogen gas that is passed to the fuel cells for conversion to electricity.

Examples of such systems are disclosed in a number of patents and patent applications, e.g. U.S. Pat. No. 8,632,928 (Signa) which uses hydrogen, and EP 1 747 588 B1 (BIC) which uses methanol as fuel.

Hydrogen is most commonly generated by a reaction between a hydride and water although there are systems employing a reaction between Al and alkali, e.g. as disclosed in ES-2,321,793 (Soler et al), U.S. Pat. No. 7,074,509 (Rosenfeld et al), and U.S. Pat. No. 8,071,242 (Rosenfeld et al).

SUMMARY OF THE INVENTION

The present inventors set out to provide an improved charger system comprising a fuel generating device for fuel cell systems, in particular charger systems, wherein the fuel generating device can be discarded after use, the novel device being less bulky and less expensive.

Thus, a system according to the invention is based on a gas generator unit that is of a disposable type, i.e. once it has been used for charging of e.g. a mobile phone it is discarded. As delivered the generator is in a passive mode, i.e. the individual components of the chemistry involved for hydrogen generation are separated, and the generator is initiated only when inserted and coupled to the charger.

In one aspect the invention provides a thin and flat hydrogen generator that can be inserted in a charger.

This object is achieved with a device as claimed in claim 1, which is a fuel generator for a fuel cell based charger system, comprising a compartment containing aluminium; means for providing a solution of water and a water soluble compound capable of reacting with aluminium to generate hydrogen gas, when dissolved in water and brought into contact with the aluminium; and means for passing said solution into the compartment containing aluminium.

The invention also provides a charger for electric equipment comprising a fuel cell assembly capable of generating electricity by converting hydrogen, and a fuel generator configured to generate hydrogen gas to provide fuel for the fuel cell assembly. The charger is characterized in that the fuel generator is provided as a member which has a thickness <15 mm, preferably <10 mm, more preferably <8 mm, and in that the charger has a slot for receiving said fuel generator, wherein the charger and the fuel generator comprises a mutually cooperating interface which is configured to enable initiation of the generation of hydrogen gas when the fuel generator is inserted in the slot in the charger.

In a further aspect the invention provides a method of operating a charger. The method comprises providing a fuel generator comprising aluminium and a water solution of a compound making up a reaction fluid capable of generating hydrogen when brought into contact with aluminium; providing a hydrogen driven fuel cell based charger device having means for accommodating the generator, said generator and charger having a common interface cooperative for providing fluid communication between the generator and the charger; priming the system by inserting the generator into the charger whereby the interface opens up fluid communication between selected parts of the system; initiating flow of reaction solution so as to bring it into contact with the aluminium whereby hydrogen begins to be produced; and feeding the hydrogen to the fuel cells in the fuel cell assembly whereby electricity is produced.

BRIEF DESCRIPTION OF THE DRAWINGS

Further scope of applicability of the present invention will become apparent from the detailed description given hereinafter and the accompanying drawings which are given by way of illustration only, and thus not to be considered limiting on the present invention, and wherein FIG. 1a schematically illustrates a charger device and a fuel generator device according to the invention before the generator is inserted in the charger;

FIG. 1b schematically illustrates a charger device and a fuel generator device according to the invention when the charger is connected to the charger by insertion in a dedicated slot;

FIG. 3a illustrates a preferred embodiment of a generator comprising two parts before coupling together;

FIG. 3b shows an assembled state of the generator of FIG. 3a;

FIG. 3c shows one embodiment of the second part comprised in the generator.

FIG. 5a shows an embodiment of an aluminium foil for use in the invention;

FIG. 5b illustrates a preferred embodiment of a compartment housing the aluminium;

FIG. 6 is a cross-section of a separate part containing alkali and mechanisms for providing fluid communication between parts;

FIG. 7a schematically illustrates a charger system before assembly;

FIG. 7b is a schematic partly broken away view of an assembled system;

FIG. 8 is schematic partly broken away view of an assembled system showing more details;

DETAILED DESCRIPTION OF PREFERRED EMBODIMENTS

Definitions

For the purpose of this invention the following terms and expressions are defined below:

"priming" means setting up the system for use without starting the generation of power (electricity)

"fuel cell assembly" means at least one fuel cell adapted to generate electric power "charger" means a device adapted to deliver a suitable output for charging electric equipment such as mobile phones, computers, razors, electric tooth-brushes, game devices "activation" means the process of starting the hydrogen generation and thereby the generation of electric power FIG. 1a schematically illustrates a charger 10 having an insertion slot 14 adapted for receiving a fuel generator, and a fuel generator 12, in a separated state, and FIG. 1b illustrates the fuel generator 12 inserted in insertion slot 14 in the charger 10. The novelty of the present system is the actual constitution of the fuel generator in one aspect, and the cooperating combination of the charger 10 and the fuel generator 12 in another.

Figures 2A, 2B:
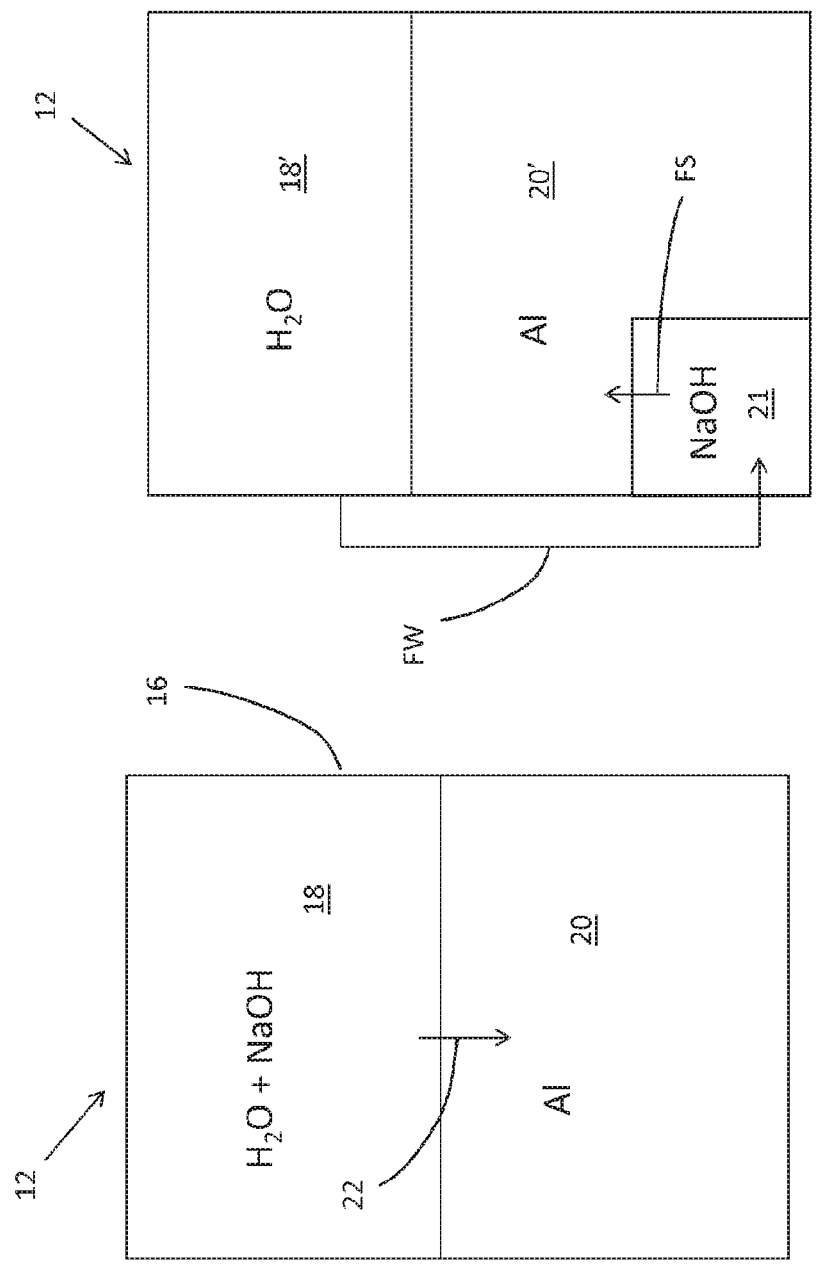
FIG. 2a is a schematic illustration of an embodiment of the hydrogen generator according to the invention.
FIG. 2b is a schematic illustration of another embodiment of the hydrogen generator according to the invention.

In FIG. 2a the general principle of the generator according to the invention is illustrated schematically.

The generator 12 comprises a housing 16 in which there is provided at least two compartments, in preferred embodiments three compartments.

FIG. 2a shows a two-compartment embodiment and FIG. 2b shows a three-compartment embodiment.

Thus, in FIG. 2a a first compartment 18 contains a solution of water and NaOH although several other alkaline compounds are useable, e.g. KOH, LiOH, Ca(OH)$_2$, and a second compartment 20 contains metallic aluminium. Suitably, the amount of aluminium is adapted to the amount of power that is to be generated, and is typically 1 g, but can vary considerably depending on the application. The amount of alkaline compound in solution is preferably 0.1-3 g.

There is provided means 22 (embodiments and details of which will be disclosed below), schematically illustrated by an arrow in the figure for providing a controlled flow of solution from the first compartment 18 to the second compartment 20 such that a chemical reaction is initiated which generates hydrogen gas:

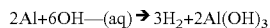

$$2Al+6OH^-(aq) \rightarrow 3H_2+2Al(OH)_3$$

It should be noted that the arrow, although it is shown as providing a fluid communication across an interface between two partitions, should not be taken as a concrete illustration and thus not limiting to the invention. In fact there are several possibilities within the inventive concept that provides more complex fluid communication structures.

The generator is provided to a user as a separate item and the compartments containing the chemistry involved are isolated from each other such that no chemical reaction that generates hydrogen can occur when not in use. The means 22 for providing the flow between the compartments 18, 20 are primed, i.e. set up for use, when the generator is inserted in the charger device by mechanisms to be described in detail below.

In FIG. 2b a first compartment 18' contains water, a second compartment 20' contains aluminium and a third compartment 21 contains solid NaOH (or other alkaline compounds, e.g. KOH, LiOH, Ca(OH)$_2$). The amount of alkaline compound In solution is preferably 0.1-3 g. In this embodiment the solution of water and the alkaline compound is generated when the generator is primed by the insertion into the charger. Thereby, means are provided for enabling spontaneous and/or assisted flow of water (arrow FW) from the first compartment 18' to the third compartment 21, whereby e.g. NaOH is dissolved and the solution is passed on (arrow FS) and into the second compartment 20' containing aluminium, whereby the hydrogen generating reaction starts.

Again, the arrows are not to be taken as concrete illustrations but are merely symbolic. The actual mechanisms can vary between embodiments.

In FIG. 3a a presently preferred embodiment of the generator device 12 is shown.

Here, generator 12 is provided in two connectable parts, a separate first part 24 and a separate second part 26, respectively. The separate first part 24 suitably contains the first and the second compartments 18', 20', containing water and aluminium, respectively, and the separate second part 26 contains the third compartment 21a containing the alkaline compound (e.g. NaOH).

In this embodiment the second part 26 is substantially smaller that the first part 24, and the first part is shaped such that a portion thereof is cut away (or void), in the shown embodiment a corner 24' thereof is "missing". The second part 26 is shaped to fit in this empty corner. In order that the second part be connectable there is provided means for retaining the second part in position when located in the mating cut-away corner of the first part. This means can be provided by the provision of a ledge 29 on the first part, in combination with a recess 28 on the separate second part 26 having a cross-section which mates with the ledge 29 (or vice versa). The second part 26 can thus be attached to the first part by placing the recess 28 adjacent the ledge 29 pushing it over the ledge 29. Of course the ledge can equally well be provided on the second part and the recess on the first part. Any other means of connecting the two parts is also usable as long as the parts are coupled together in such a way that the desired function is achieved.

The provision of the second separate part 26 at a "corner" of the first separate part 24 is only a practical constructive measure. The second part could be designed to be mounted centrally in a "cut-out" portion of the second part as well, as illustrated in FIG. 3c. However, due to the interior structure of the charger to which the generator is connected it has turned out that the illustrated embodiment is most practical.

In the action of connecting the second part 26 to the first part 24 there will also be established a fluid communication, illustrated with an arrow FC in FIG. 3b, between the third compartment 21 and the second compartment 20'. Note that at his stage no water has yet entered the third compartment 21a. Water will be supplied by separate means.

In order to provide the fluid communication from compartment 21a to compartment 20' there is provided a plunger means (not shown in this figure, to be described below) that is capable of breaking a barrier in the second compartment.

Preferably the first compartment 18' containing water is designed to have certain features to render it operable as desired.

Figure 4A:
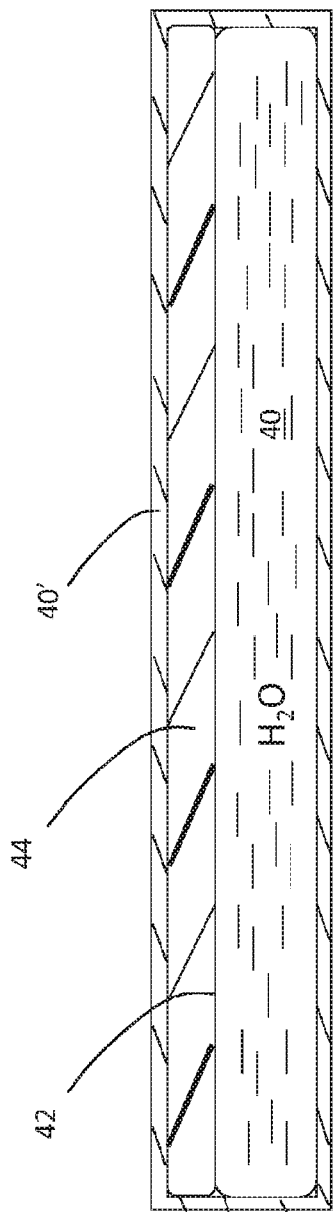
FIG. 4a-d shows embodiments of a water compartment in a generator according to the invention.

In FIG. 4a a cross-section of a preferred embodiment of the water compartment is shown.

The water compartment 40 is preferably an integrated part of the generator 12 and thus its walls 40' are part of the housing of the generator.

Inside the compartment 40 there is provided a bag 42 of a flexible material, such as plastic foil, in which the water is provided. The bag is shaped to essentially to conform to the interior shape of the compartment 40. An important feature for the operation of the generator is that there should be provided a flow of water from the compartment instantly after the system is primed for hydrogen generation. One preferred way of achieving this is to provide a slight overpressure inside the flexible bag containing the water. This could be done by filling the bag to have an inherent overpressure, but from a manufacturing point of view this would be less economic. Instead there is preferably provided a resilient member 44 inside the compartment 40 that will be somewhat compressed due it being slightly over-sized. Thus, by inserting both the bag 42 and the resilient member 44 into the compartment 40 a pressure will be exerted on the bag 42, and thus the desired overpressure is obtained.

Another advantage of having a resilient member providing the pressure is that water expands by 9% when frozen. Since the generator must be possible to keep even in freezing conditions, such as in outdoor activities in winter, the compartment 40 must be able to accommodate such expansion. The provision of a resilient member provides this function.

In FIG. 4a the resilient member 44 is shown as a piece of a suitable foam material that easily deforms but at the same time provides adequate force to provide the pressure.

Figure 4B:
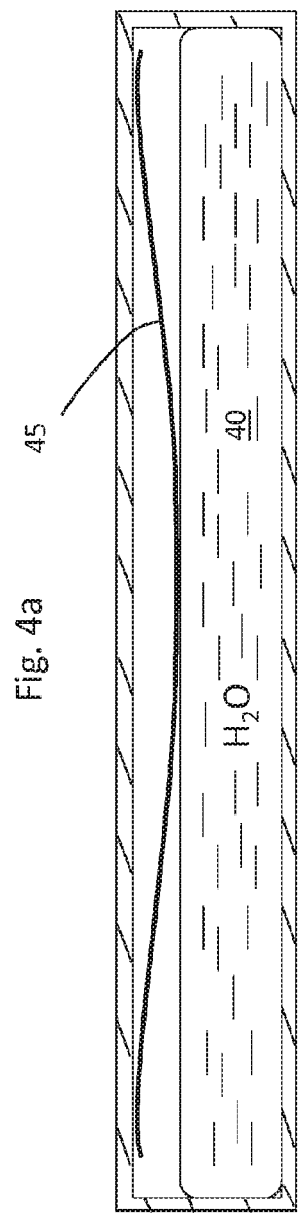
Figure 4C:
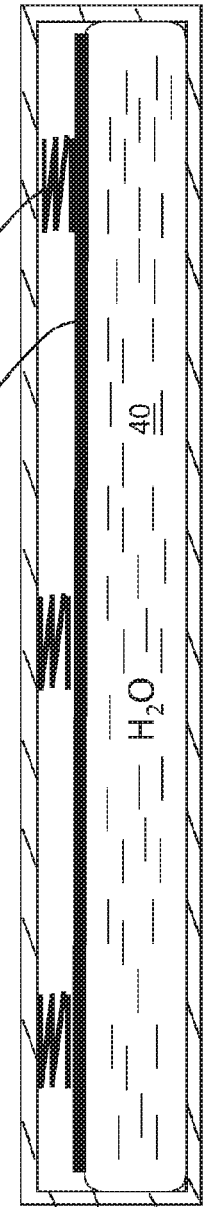
Figure 4D:
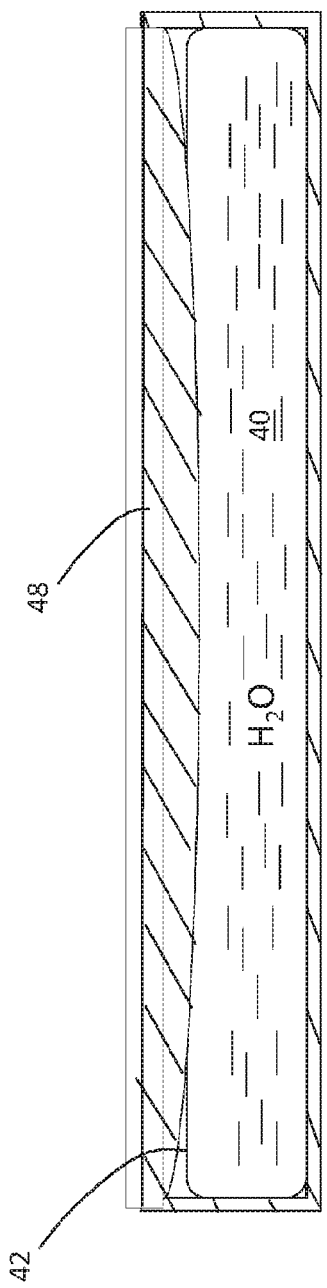

However, it is also conceivable and within the inventive concept to provide other structures for the pressurizing function. One possibility is mechanical devices using spring elements of different kinds, such as springy metal tongues 45 (FIG. 4b), or spiral springs 46 acting on a pressure plate 47 (FIG. 4c), just to mention a couple of alternatives. Also it is conceivable to make the top wall 48 of the compartment slightly convex inwards, see FIG. 4d, so as to provide a squeeze on the water bag 42.

For the purpose of initiating the flow from the water compartment 40 there is preferably provided an access point in the form of an opening in one wall 40' such that the water containing bag 42 is exposed, enabling access by a needle (described below) for puncturing the bag, said needle suitably being part of the charger unit, and which is activated when operation is to start. This will be described in further detail below in connection with the system description.

Also the compartment housing the aluminium is in a preferred embodiment designed in a specific manner, illustrated in FIG. 5.

Namely, the aluminium is provided in the form of aluminium foil 48. In order to increase the active surface, suitably the foil is provided in an expanded form, which is illustrated in FIG. 5a. This shape can easily be made e.g. by cutting slits 59 in the foil 48 and stretch it in the direction of the arrow. Preferably a plurality of foils 48 is stacked, and suitably up to 50, preferably up to 20 foils are used, although the number of foils is not critical per se. It is the active surface of the aluminium that determines the efficiency.

FIG. 5b illustrates a cross-section of an embodiment of the second compartment 50 containing the aluminium. The compartment is subdivided in two partitions, a lower compartment 51 wherein the aluminium foils 48 are stacked, and an upper compartment 52 into which the alkaline reaction solution containing water and alkali is introduced through inlets (not shown in this figure). These upper and lower compartments 52, 51 are separated by portioning member, preferably in the form of a film 53, suitably of a polymer material, that is preferably welded to the inner wall of the compartment 50 at least substantially along its entire periphery. In order to distribute the reaction solution efficiently across the entire compartment 50 so as to expose all of the aluminium to the solution to an adequate extent, the polymer film 53 is perforated such that it has a plurality of small holes through which the solution can trickle down into the lower compartment 51. The polymer material for the film 53 can be selected from materials such as PET (polyethylene-terephtalate) or PC (polycarbonate) or any other suitable polymer that can be perforated and welded, and having a thickness of 0.05-0.15 mm. The foil can alternatively also be a mesh, a woven cloth or a non-woven cloth having openings and/or pores through which the solution can migrate into the lower compartment.

Preferably, the aluminium containing compartment also contains NaCl in order to suppress formation of oxide on the aluminium, which would have a detrimental effect on the efficiency of the system. Other chlorides are also possible, such as KCl, LiCl, $MgCl_2$ or $CaCl_2$.

In FIG. 6 there is shown an embodiment of separate second part 60, below referred to as an "activation unit 60", comprising a third compartment 61 containing an alkaline compound such as NaOH, suitable for e.g. the embodiment of the generator shown in FIGS. 3a and 3b, i.e. corresponding to the separate second part 26.

This activation unit 60 comprises a housing 62, suitably made of an injection moulded plastic material. It has an attachment means 63, schematically indicated in the figure, and an embodiment of which was described in connection with FIG. 3.

The NaOH compartment 61 is provided with a septum type inlet 64 made of a material that is easily penetrated by a needle or cannula 64', which is part of a charger 10 to which the assembled generator is to be coupled (needle 64' and generator 10 shown in ghost lines), so as to provide a fluid communication into the compartment 61 for introducing water in order to dissolve the NaOH to provide the reaction solution. The material for the septum is preferably a polymer material such as silicone, although any material that can easily be penetrated and that provides a sealing function when a needle has been run through it is usable. The mechanism for providing the fluid communication and introduction of water to the compartment containing the alkaline compound (e.g. NaOH) will be described in detail later.

The activation unit 60 has an elongated channel structure 66 extending from the bottom (as seen in the figure) to the top of the unit. The channel structure extends further to form a protruding member forming a male connector element 65, adapted to fit in a corresponding and mating recess forming a female connector element 65' (schematically indicated in ghost lines) in a first separate part (corresponding to element 24 in FIG. 3a). Thereby the activation unit 60 in cooperation with the attachment means 63 efficiently locks the activation unit 60 in an operative position.

At the tip end of male connector 65 its opening is covered with a barrier 67 made of a material that is easily breakable to open up a fluid communication between the interior of said first part 24, containing the aluminium, and the channel structure 66. The channel structure 66 is subdivided in two parts, a first (lower) wider part 66a and a second (upper) narrower part 66b. At the transition between the two parts there is formed an abutment surface 66c. The channel structure 66, 66a, 66b houses a plunger member 68 which is shaped to fit snugly inside the channel structure 66, 66a, 66b but with enough tolerance such that the plunger is slidable in the channel. Thus it preferably has a wider lower part 68a fitting in the lower part 66a of the channel structure, and an upper part 68b suitably but not necessarily fitting snugly in the upper part 66b of the channel structure. The upper part has a pointed tip 68d adapted to enable breaking of barrier 67. The lower part 68a of the plunger is hollow and the upper, narrow part 68b in a preferred embodiment does not entirely fill the upper channel part 66b, such that an open volume is provided. This open volume extends through the tip such that there is an open end at the tip. The hollow part of the plunger is in fluid communication with said open volume.

The length of the plunger lower part 68a is smaller than the length of the lower channel part 66a such that the plunger is displaceable from an initial position (shown in full lines) upwards (as seen in the figure) inside the channel structure 66 to abut the abutment surface 66c in an end position (shown in broken lines). In such displaced position the tip penetrates and breaks the barrier 67. The displacement of the plunger 68 occurs automatically when the generator is inserted in a charger, by a protruding element 68' provided on the charger 10, shown in ghost lines in FIG. 6, which pushes the plunger upwards (as seen in the figure). The protruding element 68' is suitably integrated with the charger unit 10, also schematically indicated in ghost lines.

In order to provide a flow of solution from the NaOH chamber once water has been introduced therein through the needle 64' and dissolved the NaOH, there is provided an outlet 69 in the wall between the NaOH compartment and the channel structure 66. In a retracted position of the plunger 68 (full line) the plunger blocks this outlet. However, the plunger 68 has a hole 69', that will become aligned with the outlet 69 in a displaced position of the plunger 68 (broken lines), thereby establishing a fluid communication from the NaOH compartment via the hollow plunger 68 and into the compartment in the first part 24 containing the aluminium.

Now the entire system will be described in general terms with reference to FIGS. 7-8. In one embodiment the system comprises a charger 70 for electric equipment comprising a fuel cell assembly capable of generating electricity by converting hydrogen, and a fuel generator 72 configured to generate hydrogen gas to provide fuel for the fuel cell assembly. The fuel generator is preferably provided as a separate generally flat member which suitably has a thickness <15 mm, preferably <10 mm, more preferably <8 mm. Furthermore the charger unit comprising the fuel cell assembly has a slot 74 for receiving said fuel generator 72, and the charger and the fuel generator comprises a mutually cooperating interface which is configured to prime, i.e. set up, for the generation of hydrogen gas when the fuel generator is inserted in the slot in the charger.

Thus, as shown in FIG. 7a, a charger and fuel generator system according to the invention comprises a fuel cell operated charger unit 70 and a hydrogen gas generator 72 which is insertable in the slot 74 in the charger unit. The generator 72 can have different designs, as disclosed previously herein, and the general inventive concept is not dependent on any particular of the shown embodiments, although some embodiments are preferred. As shown in FIGS. 7a and 7b the generator 72 is shaped so as to have an upper part which is slightly wider than a lower part thereof. This is essentially a practical matter which simplifies the design of the mechanism for the penetration of the water bag, described below. This particular design is not mandatory, but at present preferred. All embodiments of the generator described above can be designed in this way.

The basic function and operation of a system according to the invention is based on a gas generator unit that is of a disposable type, i.e. once it has been used for charging e.g. a mobile phone it is discarded. As delivered the generator is in a passive mode, i.e. the individual components of the chemistry involved for hydrogen generation are separated, and the hydrogen generation is initiated only when the generator unit is inserted in and subsequently operatively coupled to the charger.

Setting up or priming of the system takes place when the generator is inserted in the charger. Thereby the necessary fluid communications (described above) are opened, i.e. the septum to the NaOH compartment is penetrated by a needle which is part of the charger, the communication between the NaOH compartment and the plunger is opened, and the barrier to the aluminium compartment is broken by the plunger, the plunger in turn being displaced by a protruding element integrated in the charger and configured to push the plunger when the respective parts are connected.

In order to activate the system to generate electricity a flow of water must be initiated such that the water is passed into contact with NaOH (or other alkaline compound) which thereby is dissolved to produce a reaction solution.

The mutually cooperating interface of the charger/generator includes means for penetrating the water bag 75. In preferred embodiments this penetrating means comprises a hollow needle 76 provided along a side of the housing of the charger device in the system, preferably inside the housing, schematically shown in FIG. 7b, which is a partially broken away view. The needle 76 can be manipulated manually by simply pressing a knob 77 which releases a pre-loaded spring 76' that pushes the needle upwards (as seen in the figure) whereby the bag 75 is penetrated.

A simpler way to achieve this is to have the knob 77 attached to the needle 76 and just push the knob in the direction towards the water compartment (as shown by an arrow). Alternatively, electrical devices could be used, e.g. solenoid type devices. The latter would require separate supply of electric power, e.g. from a battery.

As already mentioned earlier the water compartment is slightly pressurized, and as soon as the needle 76 has penetrated the water bag 75 water automatically begins to flow into the needle 76 and further, suitably via flexible tubing (not shown) into a channel 78 in the charger. From the channel 78 the water passes through the septum via needle 64' (suitably connected to the pump 79), as described in connection with FIG. 6, and dissolves the alkaline compound, e.g. NaOH, the solution is passed into the plunger and finally into the aluminium compartment through the plunger and its associated outlet, as described above.

The overpressure in the water bag is only sufficient to keep a flow for a very short period of time, and thus, assisted flow must be used for the continued operation. To this end there is a pump 79 provided in the charger unit, located in the channel 78. The pump 79 is coupled to power output of the fuel cell assembly, and is suitably started as soon as the fuel cells begin to generate power.

For the purpose of feeding hydrogen evolving in the aluminium compartment, there is preferably provided at least one, preferably two outlets on opposite sides of the chamber, for passing the gas into channels located in the walls of the housing. These channels feed the gas to the charger, and the structure of outlets and channels in a preferred embodiment is schematically shown in FIG. 8.

Here, the aluminium compartment 80 has two outlets 82, 84, schematically indicated with fat lines, and located in opposite ends of the compartment 80. This distribution is advantageous by enabling efficient gas removal from the compartment. These outlets are coupled to a channel structure 86 running in the walls of the compartment, an outlet of which provides a gas tight seal with a mating inlet in the charger unit, finally ending inside the fuel cell assembly 88 where the gas is fed to the fuel cells.

Figure 9:
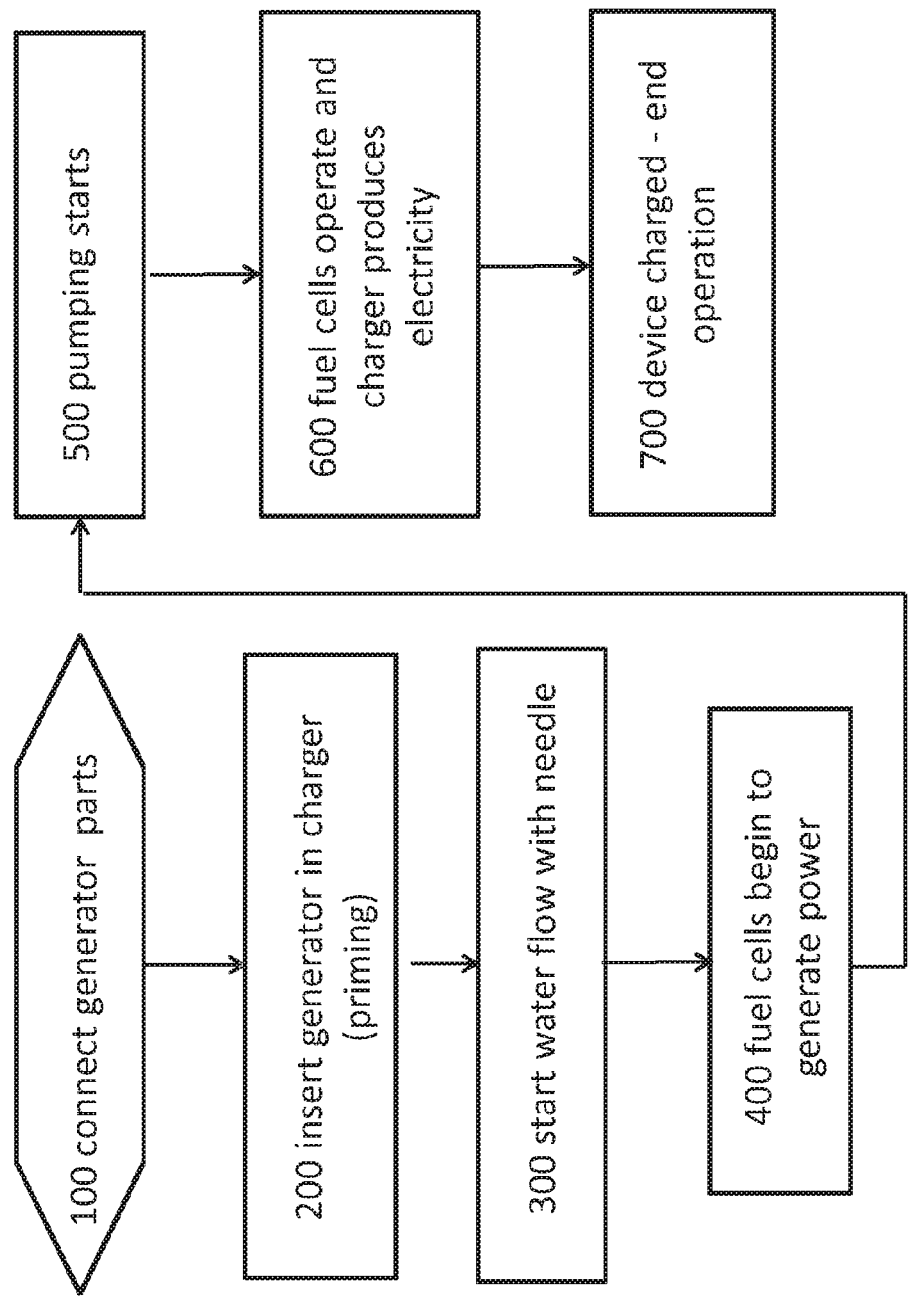
FIG. 9 is a flow chart illustrating operation of the system.

A process overview for the priming and operation of the system according to an embodiment where the generator is provided in two separate parts is shown in FIG. 9.

First 100 the generator parts are connected, whereby fluid communications are opened between the compartment containing NaOH and compartment containing aluminium.

Then 200 the assembled generator is inserted in the slot in the charger. This primes the system by opening up the inlet to the compartment containing NaOH.

Next, the water flow is initiated 300 by operating the needle for penetration of the water bag in the generator, which feeds the water into the compartment containing NaOH, dissolves NaOH to provide a solution which is fed through the plunger into the compartment containing aluminium whereby hydrogen gas begins to evolve. Power begins to be generated 400 when hydrogen is passed to the fuel cells. When the fuel cells are up and running the pump starts 500 to actively transport water through the system. Thereby a continuous supply of water and thus hydrogen is provided 600.

When the gas is no longer produced the charger stops operation, and the device to which the charger is connected is fully charged and operation stops 700.

Figure 10:
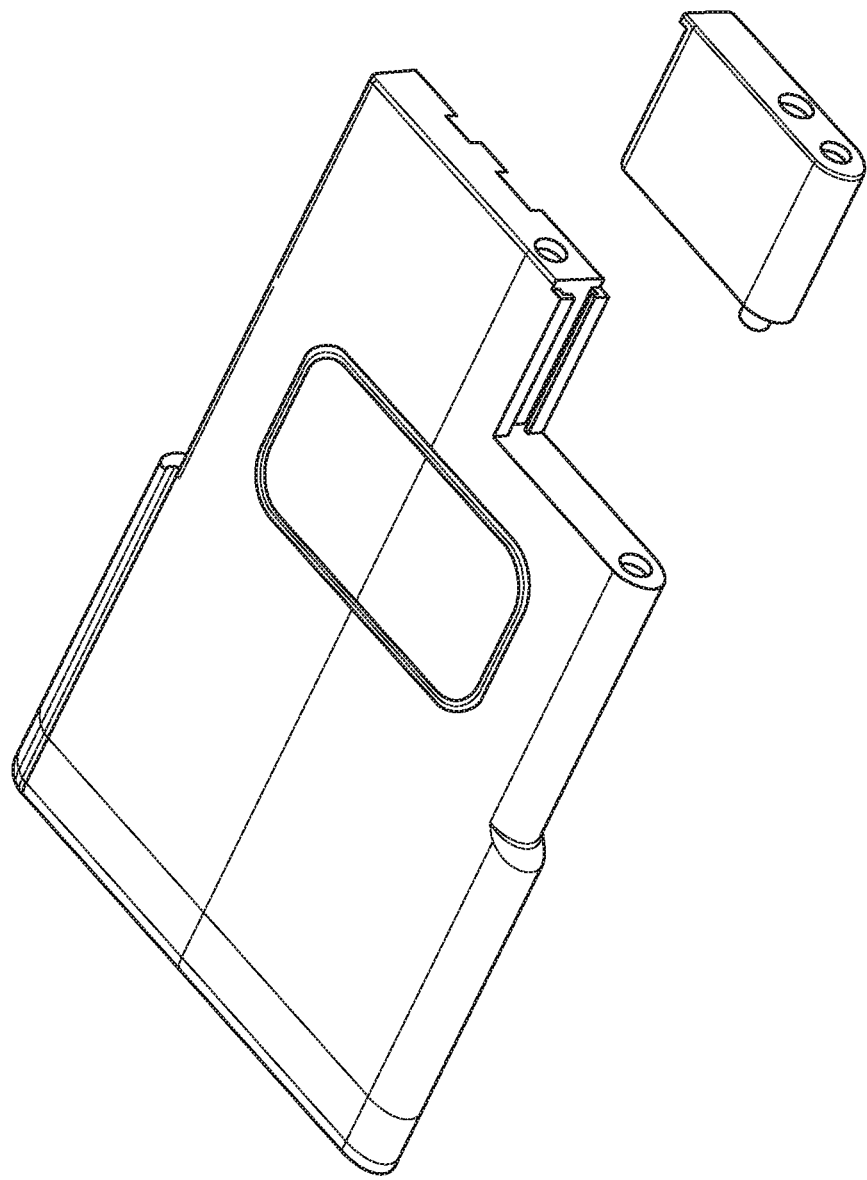
FIG. 10 is a perspective view of a generator consisting of two connectable parts in a non-connected state.
Figure 11:
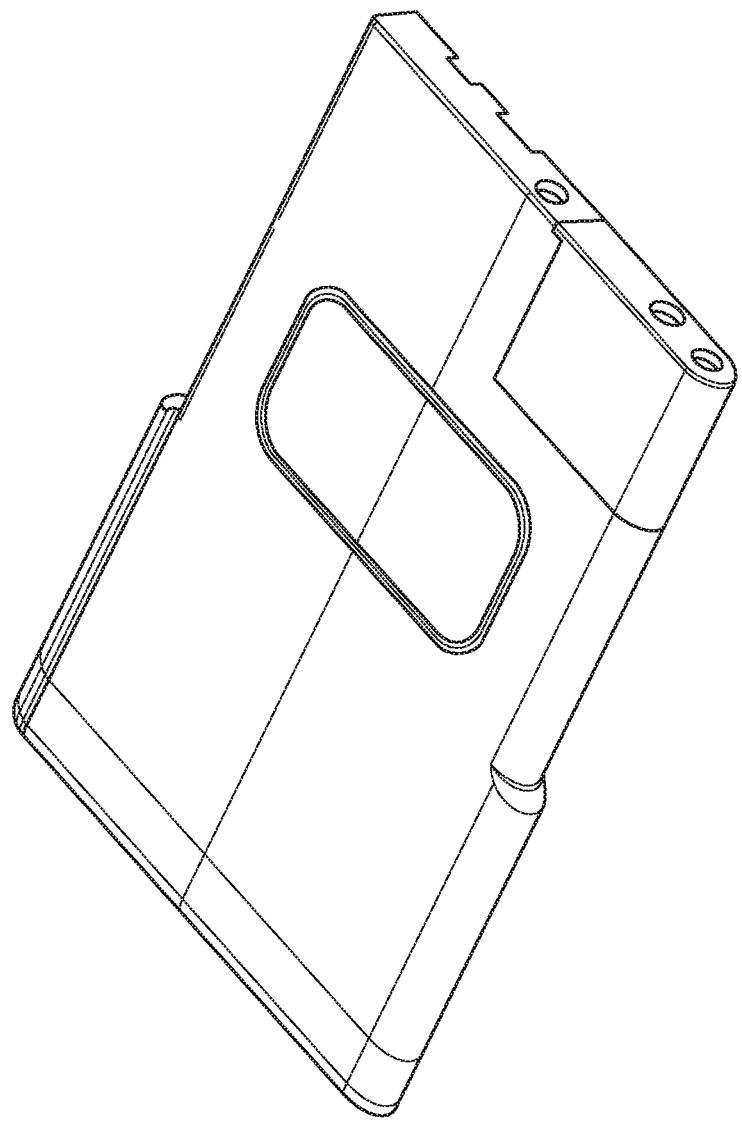
FIG. 11 shows the generator of FIG. 10 in a connected state.

FIGS. 10 and 11 are perspective views of a generator device in a presently preferred embodiment in separated state and in assembled state, respectively.

In a most general aspect the invention provides a method of operating a fuel cell based charger system. The method comprises providing a fuel generator using aluminium and a compound making up a reaction fluid capable of generating hydrogen when brought into contact with aluminium for the fuel generation. A hydrogen driven fuel cell based charger device is provided having means for accommodating the generator. The generator and charger have a common interface cooperative for providing fluid communication between the generator and the charger. The system is primed by inserting the generator into the charger whereby the interface opens up fluid communication between selected parts of the system. A flow of reaction solution is initiated so as to bring it into contact with the aluminium whereby hydrogen begins to be produced. The hydrogen is fed to the fuel cells in the fuel cell assembly whereby electricity is produced.

Preferably, the priming includes breaking a barrier to provide for reaction fluid to enter into contact with the aluminium.

Also, initiation of flow is suitably provided by opening a water containing compartment in the generator and to let the water flow to a compartment housing said compound to dissolve whereby the reaction fluid forms, and letting the reaction fluid pass into contact with the aluminium.

The invention claimed is:

1. Fuel generator (12) for a fuel cell based charger system, comprising:
   a compartment (20) containing aluminium;
   means (18) for providing a solution of water and a water soluble compound capable of reacting with aluminium to generate hydrogen gas, when dissolved in water and brought into contact with the aluminium; and
   means (22) for passing said solution into the compartment containing aluminium; wherein
   the means for providing a solution comprises a compartment (18') containing water and a compartment (21; 21a) containing the water soluble compound capable of reacting with aluminium when in solution, and a channel system (FW, FS) for bringing the water into the compartment containing the water soluble compound so as to dissolve said compound, and for passing the dissolved compound to the compartment containing aluminium, wherein the generator is composed of two separate parts (24, 26) connectable to each other, wherein a first part (24) contains aluminum and a second part (26) contains said solution of the water soluble compound, and wherein the compartment containing the water soluble compound capable of reacting with aluminum is provided as a separate first part (26) connectable to a separate second part (24) comprising water and aluminum in separate compartments.

2. Fuel generator according to claim 1, comprising:
   a first compartment (18') containing water;
   a second compartment (20') containing aluminium;
   a third compartment (21a) containing said water soluble compound capable of reacting with aluminium to generate hydrogen gas, when dissolved in water and brought into contact with the aluminium.

3. The fuel generator according to claim 2, further comprising means configured to initiate flow of water from the first compartment to dissolve the compound in the second compartment to provide a solution, and to pass the solution into the third compartment, to initiate a hydrogen generating reaction.

4. The fuel generator according to claim 2, wherein the generator is composed of two separate parts (24, 26) connectable to each other, wherein a first part (24) contains water and aluminium and a second part (26) contains said water soluble compound.

5. The fuel generator according to claim 2, wherein the first and second compartments (18', 20'; 40, 50) are provided in a separate first part (24) and the third compartment (21a) is provided as a separate second part (26), said separate first and second parts being connectable to form the generator (12).

6. The fuel generator according to claim 2, wherein the second compartment (50) further comprises a partitioning member (53) subdividing the second compartment in a lower space (51) in which the aluminium (48) is provided, and an upper space (52) for accommodating a solution of said compound in operation of the fuel generator, wherein said partitioning member (53) is perforated to enable said solution to enter the space containing the aluminium.

7. The fuel generator according to claim 6, wherein the partitioning member (53) is a foil, preferably of a polymer material, such as PET or PC, and having a thickness of 0.05-0.15 mm, wherein the foil is welded to the inner walls of the second compartment, at least substantially along its entire periphery, and wherein the foil is configured to allow said solution to enter the lower compartment through the foil.

8. The fuel generator according to claim 2, wherein the second compartment (80) has at least one gas outlet (82, 84) coupled via a channel (86) configured to provide a leak tight seal with a mating gas inlet in the fuel cell system to which it is to be connected.

9. The fuel generator according to claim 2, which has a thickness selected from the group consisting of: <15 mm, <10 mm, and <8 mm.

10. The fuel generator according to claim 2, wherein a separate second part containing the water soluble compound comprises a plunger (68, 68a, 68b) which is configured to break a barrier (67) between the compartment in the separate second part and the compartment containing aluminium in the separate first part, and to establish a fluid communication between the separate parts.

11. The fuel generator according to claim 10, wherein the separate second part (60) containing the water soluble compound further comprises a breakable barrier (64) which provides a fluid communication path for receiving water from the separate first part (24) of the generator via a fluid transport system provided in the fuel cell system.

12. The fuel generator according to claim 2, wherein the second compartment also contains a salt, selected from the group consisting of NaCl, KCl, LiCl, $MgCl_2$, and $CaCl_2$.

13. A charger (70) for electric equipment comprising a fuel cell assembly capable of generating electricity by converting hydrogen, and a fuel generator (72) according to claim 1, configured to generate hydrogen gas to provide fuel for the fuel cell assembly, characterized in that
the charger (70) has a slot (74) for receiving said fuel generator, wherein
the charger (70) and the fuel generator (74) comprises a mutually cooperating interface which is configured to enable initiation of the generation of hydrogen gas when the fuel generator is inserted in the slot (74) in the charger (70).

14. The charger according to claim 13, wherein the interface comprises a hollow penetrating member (76) for penetrating a barrier in the fuel generator to provide fluid communication between two partitions in the fuel generator, one partition (75) containing water and another containing a water soluble compound (21a), for assisted transport of water between said partitions via a fluid transport system (78) within the charger, wherein said water soluble compound is provided so as to make up a solution of said compound in water, the solution being capable of reacting with aluminium to generate hydrogen gas, the aluminium being provided in a further partition in the generator.

15. The charger according to claim 13, wherein the charger is provided with a pump (79) for providing the assisted transport of water.

16. The charger according to claim 13, wherein the hollow penetrating member (76) is spring loaded (76') and integrated in the charger and is slideably arranged therein, and wherein there is provided a push button (77) coupled to the penetrating member for releasing the spring load (76') when pressed, whereby the hollow penetrating member (76) is pushed towards said barrier and penetrates it.

* * * * *